United States Patent

[11] 3,632,205

| [72] | Inventor | Raymond Marcy<br>Paris, France |
| --- | --- | --- |
| [21] | Appl. No. | 5,619 |
| [22] | Filed | Jan. 26, 1970 |
| [45] | Patented | Jan. 4, 1972 |
| [73] | Assignee | Thompson-CSF |
| [32] | Priority | Jan. 29, 1969 |
| [33] | | France |
| [31] | | 6901745 |

[54] ELECTRO-OPTICAL IMAGE-TRACING SYSTEMS, PARTICULARLY FOR USE WITH LASER BEAMS
12 Claims, 2 Drawing Figs.

[52] U.S. Cl. .................................................. 355/53, 95/12, 355/95
[51] Int. Cl. .................................................. G03b 27/42, G03b 27/58
[50] Field of Search .......................................... 355/53, 46, 95; 95/12

[56] References Cited
UNITED STATES PATENTS

| 3,498,711 | 3/1970 | Ables et al. ................. | 355/95 X |
| 3,524,394 | 8/1970 | Sunners ....................... | 355/53 UX |
| 3,052,174 | 9/1962 | Berger .......................... | 355/95 |
| 3,494,695 | 2/1970 | Sollima et al. ................ | 355/53 |

Primary Examiner—Samuel S. Matthews
Assistant Examiner—Richard A. Wintercorn
Attorney—Flynn & Frishauf

ABSTRACT: To provide for digital positioning, without inertia of moving parts, a laser beam is transmitted to a substrate which is to be exposed, etched, or the like, particularly when microcircuits are to be produced, by monitoring the displacement of the substrate, mechanically, in two mutually perpendicular directions and positioning the laser beam, as monitored, in at least one direction by controlling voltages applied to a deflector cell in the path of the laser beam, by digitally, selectively, energizing an electro optical crystal effective to rotate the polarized laser beam through a plane of 90°, followed by a doubly refracting crystal which deviates the path of the laser beam, depending on its direction of polarization with respect to the optical axis of the crystal, so that, by successive deflections, the beam, from the laser, can be positioned in predetermined locations on the substrate. The entire arrangement is preferably computer controlled, so that data inserted into the computer will cause deflection of the laser beam in accordance with a predetermined program.

ELECTRO-OPTICAL IMAGE-TRACING SYSTEMS, PARTICULARLY FOR USE WITH LASER BEAMS

The present invention relates to tracing systems and more particularly to controlling laser beams to trace connections and patterns when manufacturing integrated microcircuits or masks for producing said circuits.

Depending upon the power of the laser-type light sources, various methods to make microcircuits are used. With a low-power laser, masks are produced from photosensitive plates which are exposed to the source. Using a more powerful laser, for example an argon laser, layers of a photoresist, successively deposited upon the substrate, are directly exposed. Using a very high-power laser, for example a yttrium-aluminium garnet (YAG) laser, a mask can be produced using the laser energy to cut a metal plate. In these systems, the laser beam is generally fixed and it is the plate which is subjected to programmed mechanical displacements in relation to the optical projecting system. Various patterns, the shape of which has been previously selected, can thus be traced and connected with one another by means of integrated connections. Due to substantial inertia of the mechanical device used to displace the plate in relation to the optical projecting system, unduly long tracing times are needed.

It is an object of the present invention to reduce tracing time when controlling the relative position of a laser beam and a target plate.

The invention is particularly applicable when tracing data which are supplied by a computer, or when recording images of written characters or even of elementary symbols, on a photosensitive substrate.

SUBJECT MATTER OF THE INVENTION

Briefly, a light-deflecting element produces displacement of a polarized light beam, parallel to itself and by digitized quantities. An element of this kind is made up of a succession of cells comprising in each case an electro-optical crystal followed by a double-refracting crystal. When electrodes connected to the electro-optical crystal are not energized, the electro-optical crystal allows incident light whose polarization is directed in accordance with one or the other or the two planes (at 90° to pass without any modification. Such light passes through the double-refracting crystal, either as undeflected rays (also known as ordinary rays), or, when rotated by the electro-optical crystal, as deflected rays (also known as extraordinary rays). Upon application of a voltage across the electro-optical crystal electrodes, rotation through 90° of the plane of polarization of the light is produced and thus path of light through the double-refracting crystal changes from a state of transmission or ordinary rays to that of transmission of extraordinary, that is, deflected rays (and vice versa). Thus, each elementary cell can adopt two distinct states which are controlled by a voltage. Consequently, for a deflector with $n$ cells, the maximum number of points which are possible is equal to $2^n$. The change from one point to the other can be effected in any arbitrary order and in a time period in the order of a microsecond. A system using these deflectors enables tracing of characters, symbols or circuits at a very rapid rate since the response of a digital deflector and also the tracing of an impression on a photosensitive substrate, are very rapid. Computer-controlled programmed displacement of the light beam enables tracing previously selected patterns on a substrate.

The invention will be described by way of example with reference to the accompanying drawings, wherein.

Figure 1:
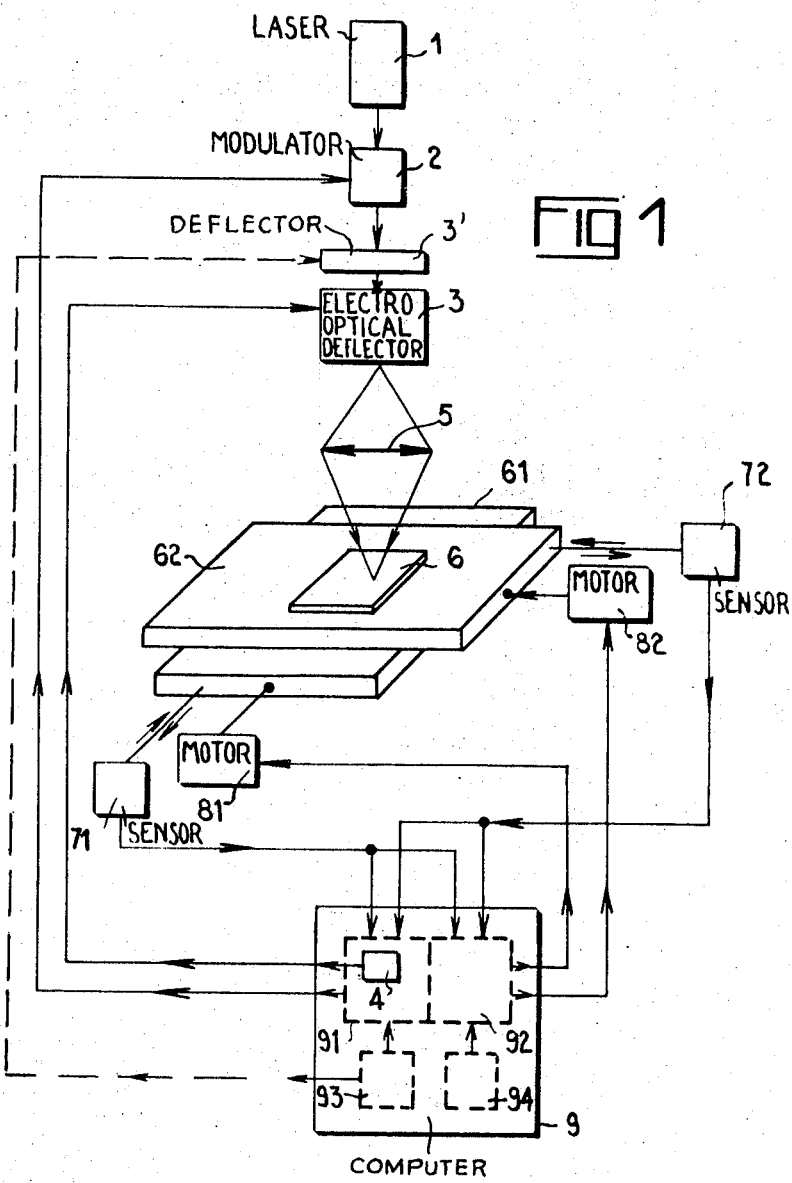
FIG. 1 is a schematic diagram of the tracing system.

A laser source 1 (FIG. 1) emits a beam which is deflected by a digital deflector 3 in only one of the two coordinates of the orthogonal plane defined by a plate 6. Plate 6 is located in the image plane of a projection lens 5 and thus receives the elementary pattern described by the laser beam. It is fixed to cross slides 61, 62 whose displacements in two mutually perpendicular directions are produced by micropositioning motors 81 and 82 in order thus to successively trace the different patterns which makeup the mask. The position detectors 71 and 72, being based for example upon the principle of laser interferometry, make it possible to sense, and hence to control these displacements.

A computer 9 is provided on the one hand to control the digital deflector 3 and on the other to control the motors 81 and 82. Computer 9 has subsystems 91 and 92 supplied respectively with the different programs from instruction units 93 and 94; both subsystems 91, 92 also are supplied with the data coming from the position detectors 71 and 72. The subsystem 92 comprises two command counters, not shown in FIG. 7, which with the help of the data which they receive respectively from the position detectors 71 and 72, determine the number of measurement quanta by which one and/or the other of the corresponding slides 61 and 62, which carry the plate 6, has displaced. The result of the comparison of these measured FIGS., with the data produced by the program 94, is used to control the motors 81 and 82. Subsystem 91 comprises a binary counter 4 each stage of which controls each of the deflection cells of the deflector 3. The binary counter 4 is only operative when it receives pulses from one of the position detectors, for example 72; it is blocked when pulses coming from the other detector, for example 71 in this case, arrive at the subsystem 91. Thus, the digital deflection by deflector 3 is only effective in one direction, any displacement of the plate 6 in another direction causing said deflection to be interrupted. The result is that the successive displacements of the laser beam, produced by the deflector 3, are directly controlled by the translatory movement of the slide 62. This strict control of the digital deflector 3 as a function of the movements of the plate 6, makes it possible to render the tracing described on said plane 6 independent of the speed of displacement and of any irregularities therein.

The subsystem 92 of computer 9, and which controls the displacement of the substrate 6 itself, may further include a command counter, one each for each direction of the displacement, and a circuit which compares the data supplied by the counter with those supplied by the corresponding program 94. If the count does not agree, further tracing can be stopped thus preventing programming and tracing errors.

In addition, the subsystem 91 controls a light modulator 2, advantageously inserted between the laser source 1 and the deflector 3, to blank (or extinguish) source 1 where no trace is to be produced.

The program 93 controls the tracing proper. It simply contains the addresses of data which will define the geometry of the patterns described by the laser beam. It furthermore enables standard programs to be called up which consist for example of programs which command tracing of a line or an area by specifying the addresses of limit points only. For example, the programming of a connection represented by a line trace, comprises the address of the point of origin of the trace, the address of the terminal point thereof and the callup of a subroutine which will command continuous tracing of the intermediate points.

Where the tracing of a complete pattern is carried out by the successive tracing of adjacent elementary spots or patterns, the tracing system of FIG. 1 may additionally comprise an arrangement for selecting the spot or elementary pattern. This arrangement is made up for example of a digital deflector 3' which causes the laser beam to scan a plate carrying holograms of the elementary spots, said arrangement advantageously being inserted between the modulator 2 and the deflector 3. In this system, the program 93 then additionally comprises the addresses of each of the elementary spots making it possible to produce either a given pattern or the connections between different patterns. This system thus permits the entirely automated manufacture of microcircuits and/or microcircuit masks, to be effected using patterns contained in coded form in a bulk memory. Such bulk memories however, are often of substantial size and this system thus has only limited applicability.

The tracing systems of the present invention may be combined with a projection system of different patterns previously stored in optical form, thus reducing the bulk of the storage medium. This combination is advantageously employed to produce the connections between the different patterns. In certain cases, it is even possible to first project incomplete patterns and then effect the internal connections by means of the digital deflection tracing system. Thus, with a single auxiliary incomplete pattern, several different patterns can be created in accordance with the commands received by the digital deflector 3.

Figure 2:
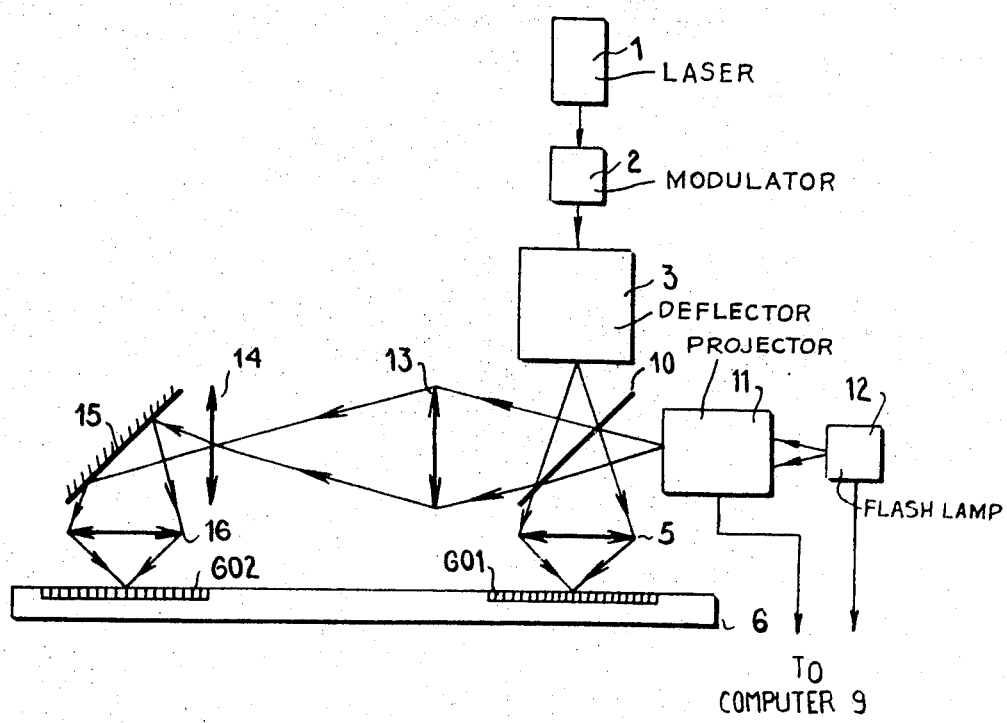
FIG. 2 is a varient embodiment of the optical part of the system of FIG. 1.

FIG. 2 illustrated the optical projection and tracing section of a system of this kind, in which two identical patterns can be traced simultaneously. In addition to the laser source 1, the modulator 2, the deflector 3 and the optical system 5, a semitransparent mirror 10 is inserted between the deflector 3 and the optical system 5, as well as a device 11 for pattern projection, illuminated by a flash source 12. The control of the selection of the patterns for projection, and the operation of the flash source 12 are controlled by the computer 9. The use of the semitransparent mirror 10 makes it possible, with the help of an image system 13 and 14, a mirror 15 and a lens 16, to effect the simultaneous tracing of two identical patterns 601 and 602 on one substrate 6, (or on several substrates) the latter then, in this case, being of the photosensitive type.

Microcircuits and/or masks for such microcircuits are produced by techniques of programmed digital scanning of an optical beam; these techniques can be combines with optical projections of the patterns which are to be traced. The control of the displacements of the plate upon which the tracing is effected, makes it possible to render the optical scanning carried out by the beam a function of said displacements and the tracing of the patterns will be independent of the speed of displacement of the plate.

I claim:

1. An electro-optical tracing system in which a laser light beam (1) is transmitted to a substrate (6) comprising
   means (71, 72) monitoring the displacement of said substrate in two mutually perpendicular directions;
   a deflection control means (9); said deflection control means having at least two inputs respectively connected to said monitoring means (71, 72);
   motors (81, 82) positioning said substrate, said motors being connected to and controlled by data derived from said deflection control means (9);
   and a digital optical deflector (3) connected to said deflection control means (9) and controlled by data from said deflection control means inputs; said deflector being inserted in the laser beam (1) between its source and said substrate.

2. System as claimed in claim 1 in which the digital deflector (3) is effective to deflect the beam in one of said directions only.

3. System as claimed in claim 1, including a light modulator (2) connected to and controlled by the deflection control means (9) arranged in the path of the laser beam between the laser source (1) and the deflector (3).

4. System as claimed in claim 1, wherein the deflection control means includes a computer (9) comprising two subsystems (91 and 92) to which there are respectively applied a program (93) relating to the control of the digital deflector (3), and a program (94) relating to the displacements of the substrate (6) by said motors (81, 82).

5. System as claimed in claim 4, in which the subsystem (91) of the computer (9), which is responsible for the control of the digital deflector (3), is characterized in that it comprises a binary counter (4) supplied with the data coming from one of the displacement monitoring means (72), said counter only operating in respect of one of said directions of displacement of the substrate (6) and remaining blocked in respect of the other.

6. System as claimed in claim 4, in which the subsystem (92) of the computer (9), which is responsible for the control of the displacements of the substrate (6), is characterized in that it comprises a command counter for each direction of displacement, as well as a circuit for comparing the data supplied by said counter, with those supplied by the corresponding program (94).

7. System as claimed in claim 1, characterized in that a device (3') for selecting elementary patterns, is inserted in the laser beam between the laser source (1) and the digital deflector (3), said device being controlled by the deflection control means (9).

8. System as claimed in claim 7, in which the device (3') for selecting elementary patterns is characterized in that it comprises a digital deflector associated with a plate carrying holograms of the said elementary patterns.

9. System as claimed in claim 1, in combination with an optical projection device (FIG. 2; 11) for projecting patterns which are to be reproduced and which are stored optically therein;
   a flashlamp (12) associated with said projection device;
   and a semireflective mirror (10), in the path of the beam between the digital deflector (3), the path of light from said projection device, and said substrate.

10. System as claimed in claim 9, including a control interconnection between the selection device (11), the flashlamp (12), and the deflection control means (9), to effect control thereof while controlling the digital deflector (3), in order to enable production of internal connections within projected patterns as well as the interconnections between patterns.

11. System as claimed in claim 9, further comprising an image system (13, 14) located behind the semireflective mirror (10); optical means including an optical projection system (15, 16) directing beams of light from said laser source (1) and said optical projection system (15, 16), towards the plane of said substrate to enable simultaneous tracing of a second pattern (602) identical to the first (601), on the substrate (6).

12. System as claimed in claim 1 wherein the digital optical deflector, inserted in the path of said laser beam comprises a succession of cells, each one comprising in series:
   an electro-optical crystal effective to rotate polarized laser beam light through a plane of 90°, when energized, said voltage being applied, selectively, as controlled by said deflection control means (9);
   and a doubly reflecting crystal in the optical path of the light from said electro optical crystal and selectively deflecting, or not deflecting light transmitted therethrough depending upon the plane of polarization of light applied thereto, as controlled by said deflection control means.

* * * * *